Figure 7:
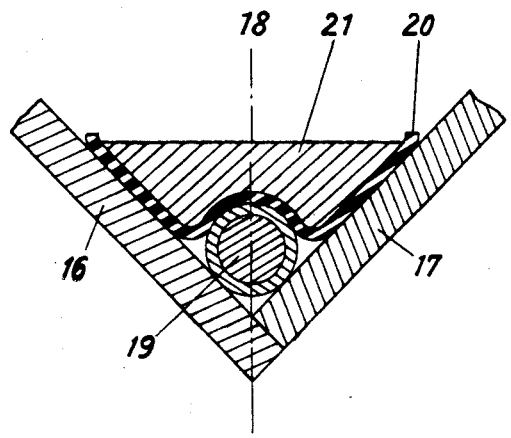
Figure 8:
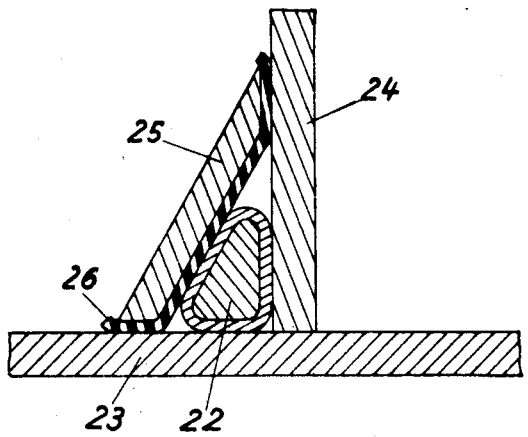

Jan. 6, 1942.   G. HAFERGUT   2,269,369
PROCESS AND DEVICE FOR ELECTRIC ARC WELDING
Filed July 17, 1939   2 Sheets-Sheet 2

Inventor
Georg Hafergut.
By Sommers & Young Attys

Patented Jan. 6, 1942

2,269,369

UNITED STATES PATENT OFFICE 2,269,369

PROCESS AND DEVICE FOR ELECTRIC ARC WELDING

Georg Hafergut, Welz, near Graz, Germany, assignor to "Elin" Aktiengesellschaft für elektrische Industrie, Vienna, Germany, a jointstock company of Germany Application July 17, 1939, Serial No. 284,940
In Germany December 27, 1938

3 Claims. (Cl. 219—10)

The invention relates to a process and device for automatic arc welding with coated electrodes or weld rods.

In the use of coated weld rods or electrodes, instead of moving the electrode along the joint to be welded by hand, it has previously been proposed to place it directly upon or along the joint longitudinally, and to strike the arc from the end of the electrode and to let it burn down along the line of the joint without further attendance.

This process is a kind of automatic welding. However, it has not only failed to obtain any importance compared with fully automatic welding by means of suitable devices and machines but has not proved practicable at all because, during welding, the electrode will continually displace itself due to the various thermal influences. By these influences, the electrode core becomes distorted so that the welding material will also be deposited at the side of the joint to be welded, thus giving entirely unsatisfactory and useless results. Moreover, the end of the electrode frequently bends upwards so that the arc is elongated by the increase of the distance between the end of the electrode and the piece to be welded and may thereby be extinguished or will at least cause considerable irregularities of the weld or other drawbacks. Moreover, if the flow of the slag is not guided and is irregular, the arc is unfavorably influenced and an irregular weld which cannot be used for industrial purposes will result.

The above-mentioned drawbacks which render it impossible to reduce to practice a process of automatic welding with coated electrodes without the aid of special apparatus are obviated by the present invention by covering the whole electrode and the arc or at least the latter and the burning-down electrode end by a body so adapted to the form of the electrode that the electrode is held in its position upon the joint to be welded, and the path of the arc and the flow of the slag are directed and guided by a closed or nearly closed channel formed by the covering body and the piece of work. It is also sufficient for the covering body to touch the surface of the electrode only at certain points or along a line.

Moreover it is advantageous to hold the electrode, preferably by means of the covering body, and the covering body should extend somewhat beyond the joint to be welded so that the correct position of the electrode and arc is assured until the point of depositing the welding material reaches the end of the joint to be welded.

For welding butt joints of the usual kind, a bar of the same length as the electrode and having a groove is placed against the electrode with the electrode in the groove and the electrode and said bar are together placed upon the joint to be welded. If the covering bar is made of metal, carbon or another conducting substance, or of a plastic material, it is advantageous to insert an insulating layer consisting for instance of paper or some other substance and having the form of a strip, between the electrode and the covering bar, or between the piece of work and the covering body, or between the piece of work and the electrode, on the one hand, and the covering body, on the other hand. The insertion of the intermediate layer consisting of paper or of other electrically and, if desired, thermally insulating substances serves for insulating the covering body which might be electrically conductive, from the piece of work and thus for reliably preventing the arc from striking also to the covering body and from fusing the latter. The intermediate layer serves moreover for protecting the covering body to a certain extent from the direct influence of the heat.

If the intermediate insulating layer inserted according to the invention consists of paper or another combustible substance, it accomplishes, in addition to what has been stated above, the further task of eagerly attracting, during its own combustion, the oxygen that might still be present in the welding channel. The atmosphere in the channel will thus be made perfectly nonoxidizing and the metallurgical qualities of the weld will be still further improved. If desired, the intermediate layer may have added to it some particularly active deoxidizing agents or may event consist of such chemical agents.

The covering body or bar can also have an insulating and, if desired, deoxidizing layer applied to the surface thereof facing the electrode and the piece of work.

The covering body can also consist of various suitably shaped component parts which are joined to each other in such way that the assembled body conforms to and follows the course of the joint to be welded.

The covering body can also have the form of a roller, the peripheral surface of which must be shaped so as to conform to the size and shape of the electrode. In operation, the roller, which by contact with its peripheral surface, guides the electrode and sufficiently covers its fusing end, is work 23, 24 and the covering body 25 with the insulating layer 26 that the larger diameter of the cross section is lying in vertical direction.

For the welding process, coated electrodes of any desired length can be used. The welding takes place at a speed many times greater than that of a normal hand welding by means of the same electrodes. Furthermore, the welding process is completely automatic, the electrode, upon striking the arc at one end thereof, fuses down without any additional operation as far as the current leading-in end, so that the attendant will be free, during the welding time, for another job, for instance, for the preparation of the next joint to be welded.

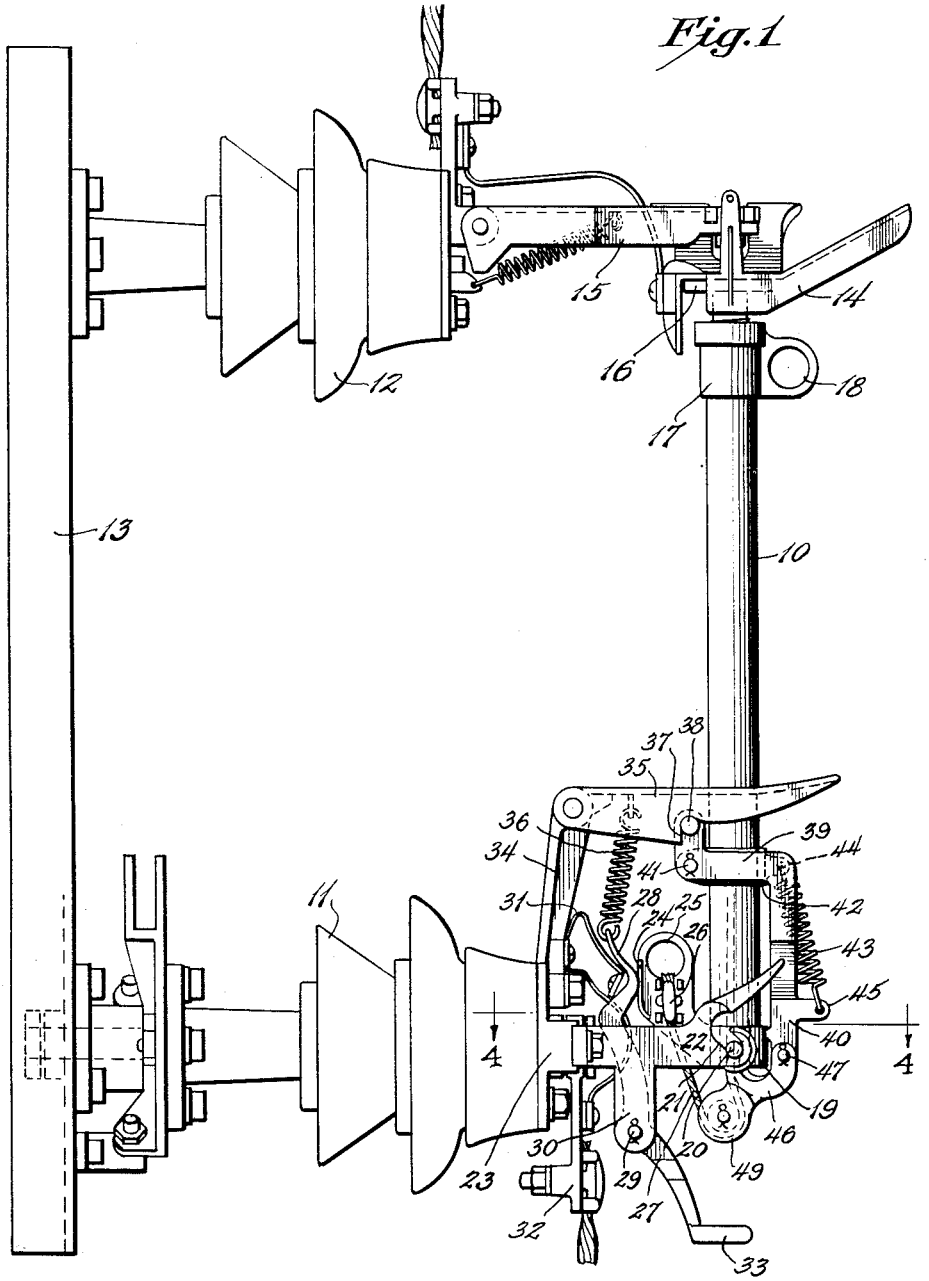

I claim:

1. The process of welding work pieces together by electric arc welding with fully coated weld rods comprising placing the edges of the work pieces close together in the relative position in which they are to be joined together, placing an elongated fully coated weld rod longitudinally along the edges to be joined, covering and mechanically pressing on said weld rod with a rigid, solid body, supplying the weld rod and work with welding electric current so that an arc strikes from the end of the rod to the work and fuses the rod to join the edges of the work and travels longitudinally of the rod and work as the welding progresses while the rigid, solid body covering the weld rod substantially excludes the atmosphere from the welding zone and directs and guides the path of the arc and the flow of the slag, and constrains the weld rod, including the portion of the rod from which the arc is striking, to remain close to the edges of the work pieces to be joined by resisting tendencies of the weld rod to be deformed away from the work under the influence of the heat or other influences.

2. The process of welding work pieces together by electric arc welding with fully coated weld rods comprising placing the edges of the work pieces close together in the relative position in which they are to be joined together, placing an elongated fully coated weld rod longitudinally along the edges to be joined, covering and mechanically pressing on said weld rod with a rigid, solid body, supplying the weld rod and work with welding electric current so that an arc strikes from the end of the rod to the work and fuses the rod to join the edges of the work and travels longitudinally of the rod and work as the welding progresses while the rigid, solid body covering the weld rod substantially excludes the atmosphere from the welding zone and directs and guides the path of the arc and the flow of the slag and presses the weld rod against the joint to be welded from a point substantially opposite the point at which welding is occurring, and progressively moving the point of pressing as the welding progresses whereby tendencies of the rod to become spaced from the joint under the influence of welding conditions is resisted.

3. In apparatus for welding elongated joints of work pieces, a fully coated electrode of a shape adapted to be placed longitudinally closely upon the joint to be welded, a rigid, solid body having a shape substantially similar to a part of the surface of the electrode for mechanically contacting and pressing the electrode laterally against the joint to be welded and to prevent deformation of the electrode, including the portion thereof from which the arc is striking, tending to separate it from the joint, the said solid body being also shaped to form, together with parts of the work pieces, which are adjacent the joint to be welded, a channel within which the electrode lies while the welding is taking place.

GEORG HAFERGUT.